United States Patent [19]

Mills et al.

[11] 4,315,141

[45] Feb. 9, 1982

[54] ELECTRICAL HEATING APPARATUS WITH OVERHEATING PROTECTION

[75] Inventors: Edwin R. Mills, Raleigh; Ernest L. Elmore, Smithfield, both of N.C.

[73] Assignee: Fieldcrest Mills, Inc., Eden, N.C.

[21] Appl. No.: 184,201

[22] Filed: Sep. 5, 1980

[51] Int. Cl.[3] .............................................. H05B 1/02
[52] U.S. Cl. .................................. 219/505; 219/508; 219/509; 219/510; 219/212; 219/504; 307/252 B
[58] Field of Search ............... 219/505, 508, 509, 510, 219/507, 501, 212, 528, 529, 504; 323/24, 22 SC, 235; 307/252 UA, 252 B

[56] References Cited

U.S. PATENT DOCUMENTS

| | | | |
|---|---|---|---|
| 3,222,497 | 12/1965 | Gordon, Jr. | 219/212 |
| 3,356,825 | 12/1967 | Mills et al. | 219/212 |
| 3,683,151 | 8/1972 | Mills et al. | 219/212 |
| 4,198,562 | 4/1980 | Mills et al. | 219/212 |

*Primary Examiner*—B. A. Reynolds
*Assistant Examiner*—M. Paschall
*Attorney, Agent, or Firm*—Bell, Seltzer, Park & Gibson

[57] ABSTRACT

An electrical heating apparatus, and particularly a bedcover preferably in the form of a blanket, protected against an overheating condition and in which electrical current flow through a heating element is controlled by a pair of gate controlled bidirectional semiconductor switches electrically connected to one another in series and in front-to-front orientation. The gates of the semiconductor switches are connected through a temperature sensitive capacitor which triggers the semiconductor switches from a conductive to a nonconductive state in response to the sensing of an overheating condition.

7 Claims, 6 Drawing Figures

ELECTRICAL HEATING APPARATUS WITH OVERHEATING PROTECTION

FIELD AND BACKGROUND OF INVENTION

Electrical heating appliances, and particularly electrical heating apparatus in the form of bedcovers such as electric blankets, are popular with consumers and have represented a commercially significant area of development. In part for those reasons, it is significant, in such apparatus, to provide for protection against an overheating condition. Many arrangements for protecting against an overheating condition are known from previous work and at least some of such arrangements have achieved significant commercial success.

Due in part to the popularity of such electrical heating apparatus with consumers, agencies which certify the safety of such apparatus insist upon the use of electrical circuitry which is effective for protecting a user even in the event of failure of a component of the circuitry.

While "solid state" or semiconductor circuits such as those illustrated in prior U.S. Pat. Nos. 3,356,825, 3,588,446 and 4,198,562 have achieved some success, attainment of a desired result of both a smooth bedcover structure and failsafe circuitry has presented some difficulty. More particularly, approval by certifying agencies is denied where failure of any given circuit component can possibly result in the electrical heating apparatus failing with electrical current applied to an electrical heating element, due to the risk of an occurrence of overheating.

BRIEF DESCRIPTION OF INVENTION

It is an object of the present invention to achieve protection against an overheating condition in an electrical heating apparatus through the provision of circuitry which provides semiconductor switches which interrupt the supply of electrical current in response to the sensing of an overheating condition and in which the semiconductor switches are connected for effectively blocking current flow in the event of failure of a circuit component. In realizing this object of the present invention, a pair of gate controlled bidirectional semiconductor switches are electrically connected to one another and to an electrical heating means in a specific manner.

Yet a further object of the present invention is to protect an electrical heating apparatus, such as a bedcover in the form of a blanket, against an overheating condition through the use of overheat protection means including a temperature sensitive impedance means thermally coupled to an electrical heating element for sensing an occurrence of an overheating condition of the electrical heating element. In realizing this object of the present invention, a pair of conductors electrically separated one from the other by a temperature sensitive dielectric material are electrically connected to the gates of bidirectional semiconductor switches so as to control triggering of the semiconductor switches from a conductive to a nonconductive state in response to the sensing of an overheat condition.

BRIEF DESCRIPTION OF DRAWINGS

Some of the objects of the invention having been stated, other objects will appear as the description proceeds, when taken in connection with the accompanying drawings, in which.

DETAILED DESCRIPTION OF INVENTION

While the present invention will be described hereinafter with particular reference to an embodiment illustrated in the accompanying drawings, it is to be understood at the outset of the following description that it is contemplated that persons skilled in the applicable arts may modify the specific arrangements now to be described while achieving the desirable result of the present invention. Accordingly, the description which follows is to be understood as a broad, teaching disclosure and not as being restrictive upon the scope of the present invention.

Figure 1:
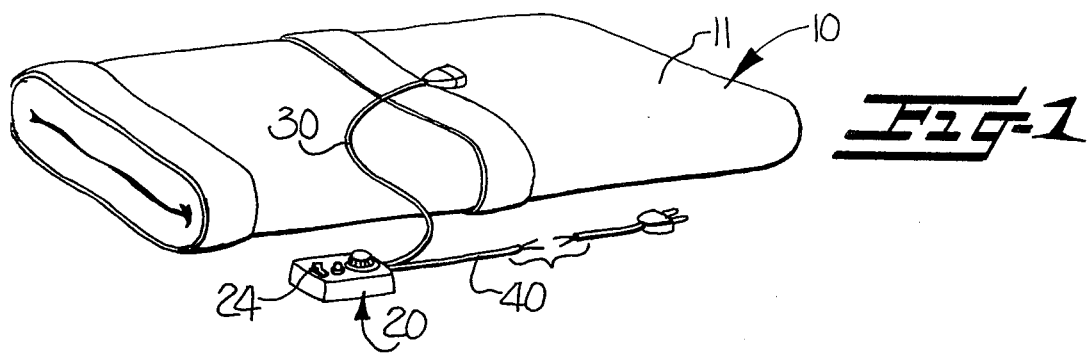
FIG. 1 is a perspective view of an electrical heating apparatus in accordance with the present invention, in the form of a bedcover and particularly an electrical blanket.

An electrically heated apparatus, and particularly a bedcover, in accordance with the present invention, comprises a bedcover preferably in the form of a blanket generally indicated at 10 (FIG. 1). A bedside comfort control housing generally indicated at 20 is connected with the blanket 10 by a cable generally indicated at 30 and with an appropriate source of electrical power by a power cord generally indicated at 40. Circuitry within the bedside control housing 20 and the bedcover 10, in accordance with the present invention, will be described hereinafter with particular reference to FIGS. 2 and 3 and accomplishes electrical heating of the apparatus illustrated in FIG. 1. Readers familiar with prior U.S. Pat. No. 4,198,562 will be aware that the circuitry may be divided in alternative manners as there disclosed. To any extent necessary for a full understanding of the possible range of constructions for a bedcover in accordance with the present invention, the disclosure of that prior patent is incorporated by reference hereinto.

Figure 3:
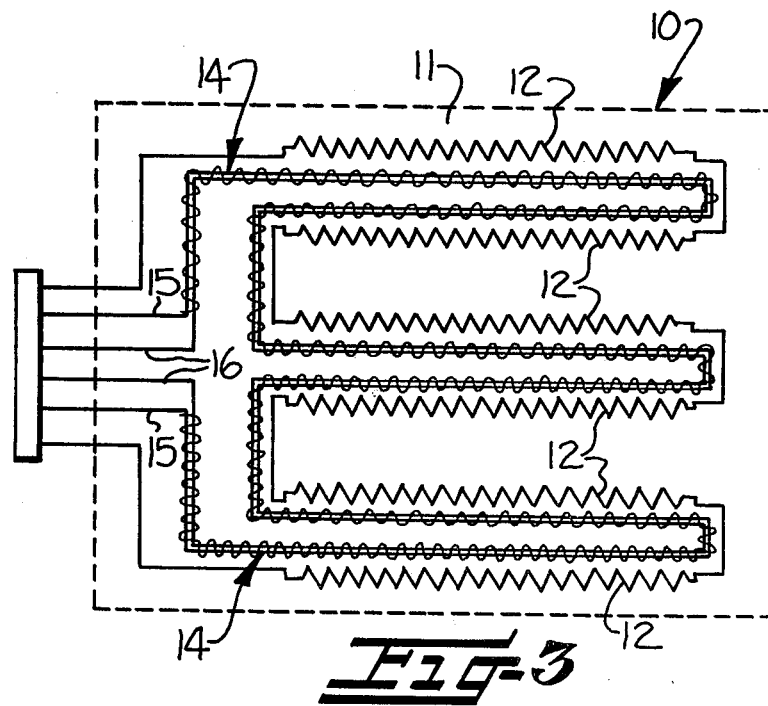
FIG. 3 is a schematic diagram of electrical circuitry incorporated within the blanket of FIG. 1.

Referring now to FIG. 3, the bedcover 10 is there schematically illustrated as comprising a textile blanket shell 11 and an electrical resistance heating element means 12 disposed in and extending through channels formed in the blanket shell. As is known, the electrical heating means 12 generates heat upon flow of electrical current therethrough. The blanket additionally includes overheat protection means including temperature sensitive impedance means preferably in the form of a signal wire generally indicated at 14. The signal wire 14 is thermally coupled to the electrical heating element 12 for sensing the occurrence of an overheating condition of the heating element.

In the form illustrated, the signal wire or sensor wire 14 is similar to that disclosed, for example, in Gordon U.S. Pat. No. 3,222,497. In particular, the sensor wire 14 comprises a pair of conductors normally electrically separated one from the other by a temperature sensitive dielectric material and positioned within the blanket shell 11 in close proximity to the electrical heating element 12. The pair of conductors 15, 16 forming the sensor wire 14 are capacitively coupled to one another.

Within the control housing 20 are provided a comfort control and a pair of gate controlled bidirectional semiconductor switches. The comfort control may take a generally known form, including a bimetallic switch member 21 and a compensating heater 22. Alternatively, the comfort control may take such other forms as are disclosed in U.S. Pat. No. 3,588,446 mentioned above. An on-off switch 24 is provided for controlling heating by the apparatus.

The gate controlled bidirectional semiconductor switches 25, 26 used in the apparatus of the present invention are of the types which have been identified by some persons by the generic term "quadrac" and are available from various manufacturers. The quadrac is a bistable semiconductor device triggered through an integral diode and which can block voltage in either direction, conduct current in either direction, and be triggered for conducting current in either direction by the application of gate signals. The basic switch structure typically includes a terminal $MT_1$ and an adjacent gate terminal G located on one side of the device, and a terminal $MT_2$ on the opposite side. The region of the semiconductor between the terminals $MT_1$ and $MT_2$ is in the form of a pair of parallel semiconductor switches. The schematic symbol for such a portion is a pair of complementary triangular symbols. The gate terminal is indicated by a line emanating from the $MT_1$ side of the schematic symbol and including, within the envelope of the device, complementary triangular symbols indicating the diac or diode characteristic of the gate portion of the device. Terminal $MT_1$ is the reference point for measurement of voltages and currents at the gate terminal G and at the opposite terminal $MT_2$. The $MT_1$ terminal side of the switch is often regarded as the "front" of the device and the $MT_2$ terminal side of the quadrac is regarded as the "back" of the device. For ease of understanding, this terminology is used in the present description and claims in order to specify the interconnection of the pair of switches 25, 26.

In particular, it will be noted that the pair of gate controlled bidirectional semiconductor switches 25, 26 provided in accordance with the present invention are electrically connected to one another in series and in front-to-front orientation. That is, the $MT_1$ terminal sides of the devices are directly joined, with the $MT_2$ terminal sides serving to connect the switches 25, 26 in series relation with the electrical resistance heating element 12 and the comfort control compensating heater 22 and switch 21.

In order to accomplish overheat protection in accordance with the present invention, means are provided which electrically connect the respective gates G of the switches 25, 26 to one another through the temperature sensitive impedance means or sensor wire 14. Resistances and a capacitor 28 are included, and the connecting means is joined with the $MT_2$ terminals of the switches, for normally triggering the switches 25, 26 into conductive states.

During normal operation, because of the coupling through the sensor wire conductors 15, 16, gate signals pass to the switches 25, 26 and trigger the devices in phase relation with the cycles of alternating electrical current applied such that substantially full cycles of alternating electrical current are conducted to the heating element 12. When an overheating condition occurs, however, the change in impedance value of the sensor wire 14 reduces gate signals to a level below that sufficient to trigger the switches into a conductive state. Consequently, the switches 25, 26 become nonconductive and interrupt the flow of current to the heating device.

In the event that either of the switches 25, 26 should fail in an open or nonconducting state, the circuit enters a condition in which no current is conducted to the heating element 12. Should one switch fail in a shorted or conductive state, the other switch enters a condition in which no current is conducted to the heating element 12, due to the coupling of the gates of the switches directly one to another through a suitable capacitor 28. This result also follows from the "cross-over" connection of the gate circuits. That is, the gate G for one switch 26 is connected to the "back" terminal $MT_2$ of the other switch.

Figure 4:
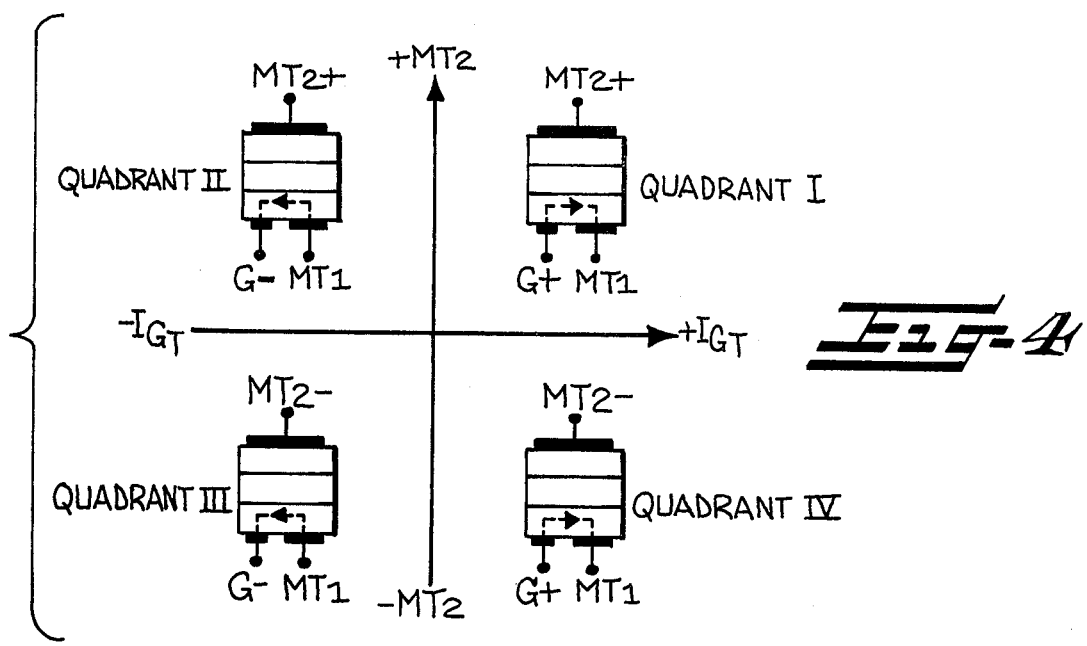
FIG. 4 is a schematic diagram of a semiconductor device as operating under certain conditions of bias among the terminals of the device.
Figure 5:
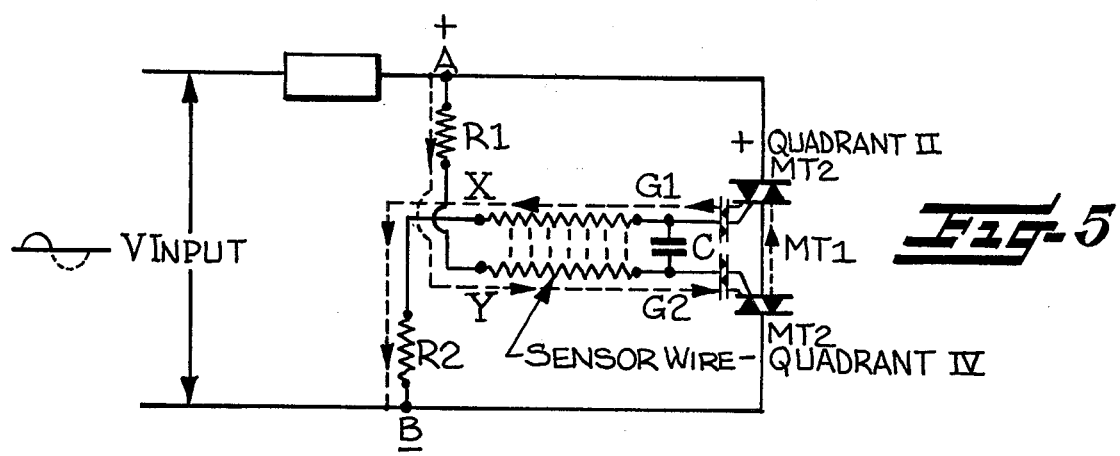
FIG. 5 is a schematic diagram of circuitry corresponding to that of FIGS. 2 and 3 and marked to illustrate particular directions of current flow occurring during operation of the circuitry during a particular half cycle of alternating current.
Figure 6:
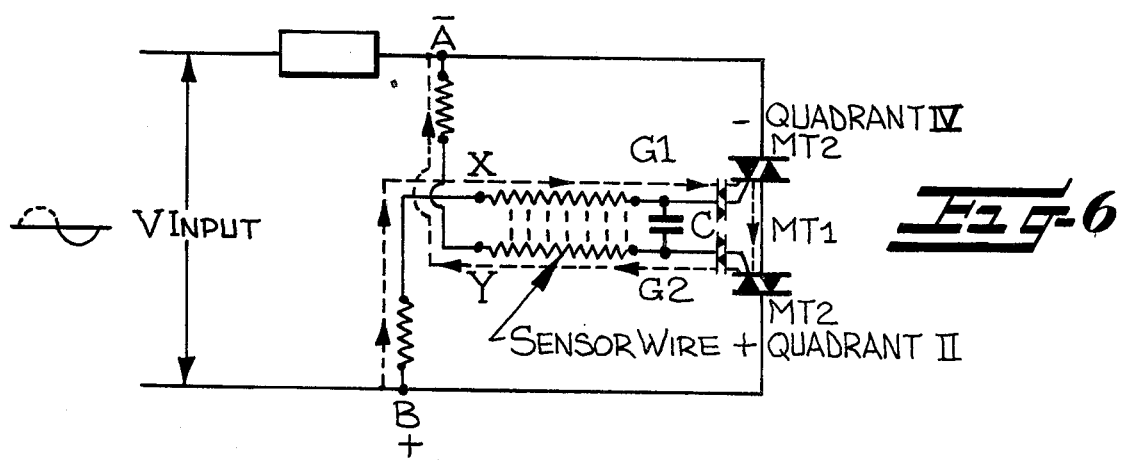
FIG. 6 is a schematic diagram similar to that of FIG. 5 and illustrating operation during another half cycle of alternating current.

Operation as described immediately above, which is the preferred operation for the circuit of the present invention, follows from certain characteristics of the switches 25, 26 and of the circuit which may be understood more clearly from FIGS. 4, 5 and 6. FIG. 4 includes coordinates representative of current flow relative to the gate and voltage present on the "back" terminal $MT_2$. That is, the vertical coordinate in FIG. 4 distinguishes positive or negative voltage levels applied to the back terminal of a device, while the horizontal coordinate distinguishes between directions of current flow through the gate. The conditions illustrated are identified by quadrants, beginning with quadrant 1 where current flow through the gate is positive and voltage applied to the back terminal is also positive.

Figure 2:
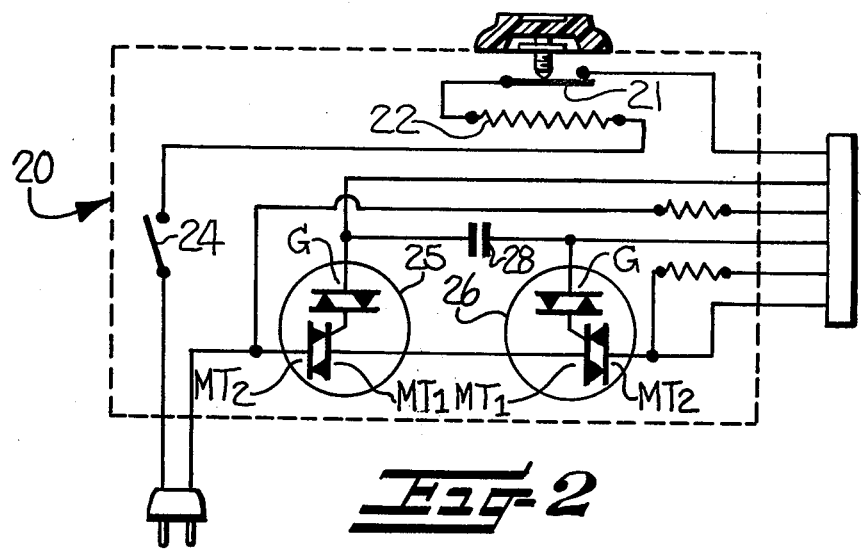
FIG. 2 is a schematic diagram of control circuitry used in conjunction with the blanket of FIG. 1.

FIG. 5 illustrates the condition applicable to the circuitry of FIGS. 2 and 3 during a first or positive going half cycle of alternating electrical current applied to the circuit. As indicated by phantom arrow lines, current flow from the gate of one switch places that switch operating under the conditions of quadrant 2 (with reference to FIG. 4) while conditions with respect to the other switch place that device as operating under the conditions of quadrant 4. During the next following negative going half cycle of alternating current, the conditions of the switches reverse, with the switch which earlier had been operating in a quadrant 2 condition now operating in a quadrant 4 condition. Similarly, the switch which operates in a quadrant 4 condition during a positive going half cycle, operates in a quadrant 2 condition during the negative going half cycle.

In the drawings and specifications, there has been set forth a preferred embodiment of the invention, and although specific terms are employed, they are used in a generic and descriptive sense only and not for purposes of limitation.

That which is claimed is:

1. An electrical heating apparatus protected against an overheating condition and against a switch failure condition and comprising electrical heating means for generating heat upon flow of electrical current therethrough, overheat protection means including temperature sensitive impedance means thermally coupled to said electrical heating means for sensing the occurrence of an overheating condition therein, a pair of gate controlled bidirectional semiconductor switches electrically connected to one another in series and in front-to-front orientation, means electrically connecting said pair of semiconductor switches to said heating means for controlling the flow of electrical current thereto, and means electrically coupling the gate of each one of said semiconductor switches to the gate of the other one of said semiconductor switches through said temperature sensitive impedance means for triggering of the semiconductor switches from a conductive to a nonconductive state in response to the sensing of an overheating condition by said temperature sensitive impedance means, said last named means electrically connecting the gate of each one of said semiconductor switches to the other one of said semiconductor switches for preventing triggering of either of the semiconductor switches in the event that one of said semiconductor switches fails in shorted condition.

2. Apparatus according to claim 1 wherein said temperature sensitive impedance means comprises a pair of conductors electrically separated one from the other by a temperature sensitive dielectric material and positioned in close proximity to said electrical heating means for sensing the occurrence of an overheating condition therein.

3. Apparatus according to claim 1 wherein said temperature sensitive impedance means comprises a pair of conductors electrically separated one from the other by a temperature sensitive dielectric material and being capacitively coupled to one another in series and electrically connected to the respective gates of said semiconductor switches and positioned in close proximity to said electrical heating means for sensing the occurrence of an overheating condition therein.

4. Apparatus according to claim 1 wherein said means electrically connecting said gates comprises conductors connecting the gate of each said semiconductor switch to the back of the other said semiconductor switch.

5. An electrically heated bedcover protected against an overheating condition and against a switch failure condition and comprising a bedcover, electrical heating means in said bedcover for generating heat upon flow of electrical current therethrough, overheat protection means including temperature sensitive impedance means located in said bedcover for sensing the occurrence of an overheating condition in said bedcover, a pair of gate controlled bidirectional semiconductor switches electrically connected to one another in series and in front-to-front orientation, means electrically connecting said pair of semiconductor switches to said heating means for controlling the flow of electrical current thereto, and means electrically coupling the gate of each one of said semiconductor switches to the gate of the other one of said semiconductor switches through said temperature sensitive impedance means for triggering of the semiconductor switches from a conductive to a nonconductive state in response to the sensing of an overheating condition by said temperature sensitive impedance means, said last named means electrically connecting the gate of each one of said semiconductor switches to the other one of said semiconductor switches for preventing triggering of either of the semiconductor switches in the event that one of said semiconductor switches fails in shorted condition.

6. An electrically heated bedcover protected against an overheating condition and comprising:
a bedcover,
electrical heating means in said bedcover for generating heat upon flow of electrical current therethrough,
comfort control means separate from said bedcover and operable between electrically conductive and nonconductive states for controlling conduction of alternating electrical current therethrough,
elongate cable means extending between and electrically connecting said heating means and said comfort control means, and
overheat protection means operable for interrupting the flow of electrical current to said heating means in response to an overheating condition and comprising temperature sensitive impedance means located in said bedcover for sensing the occurrence of an overheating condition in said bedcover, a pair of gate controlled bidirectional semiconductor switch means electrically connected to one another in series and in front-to-front orientation and also electrically connected in series with said heating means for controlling the flow of electrical current thereto, and means coupling the gate of each one of said semiconductor switch means to the gate of the other one of said semiconductor switches through said temperature sensitive impedance means for triggering of the semiconductor switches from a conductive to a nonconductive state in response to a predetermined change in the impedance of said temperature sensitive impedance means resulting from the occurrence of an overheating condition, said last named means electrically connecting the gate of each one of said semi-conductor switches to the other one of said semiconductor switches for preventing triggering of either of the semiconductor switches in the event that one of said semiconductor switches fails in shorted condition.

7. An electrically heated bedcover according to claim 5 or 6 wherein said temperature sensitive impedance means comprises a pair of conductors electrically separated one from the other by a temperature sensitive dielectric material and being capacitively coupled to one another in series and positioned in said bedcover for sensing the occurrence of an overheating condition therein.

* * * * *